United States Patent [19]

Heier

[11] 4,195,754
[45] Apr. 1, 1980

[54] SLUSH DISPENSER

[75] Inventor: William Heier, Warminster, Pa.

[73] Assignee: Refreshment Machinery Incorporated, Warminster, Pa.

[21] Appl. No.: 885,917

[22] Filed: Mar. 13, 1978

[51] Int. Cl.² .......................... A23G 5/02; F25C 7/06
[52] U.S. Cl. ................................ 222/146 C; 222/239; 222/325; 366/296
[58] Field of Search .............. 366/293, 294, 295, 296, 366/309; 222/236, 238, 239, 146 C, 325

[56] References Cited

U.S. PATENT DOCUMENTS

| 1,710,435 | 4/1929 | Shelburne | 222/325 |
| 1,863,452 | 6/1932 | Rowland | 366/296 |
| 1,997,035 | 4/1935 | Arbuckle | 366/296 |
| 2,209,287 | 7/1940 | Simpson | 366/296 |
| 2,807,447 | 9/1957 | Vaughan | 366/296 |
| 3,176,968 | 4/1965 | Appleton | 366/296 X |

FOREIGN PATENT DOCUMENTS 554139  9/1974  Switzerland .................... 222/146 C Primary Examiner—David A. Scherbel
Attorney, Agent, or Firm—Seidel, Gonda, Goldhammer & Panitch

[57] ABSTRACT

A slush dispenser having a container of flavored slush or the like is provided with first and second blades rotatable in opposite directions within the container by a single motor. The container and blades are removable without the need for tools to facilitate maintenance and cleaning.

13 Claims, 11 Drawing Figures

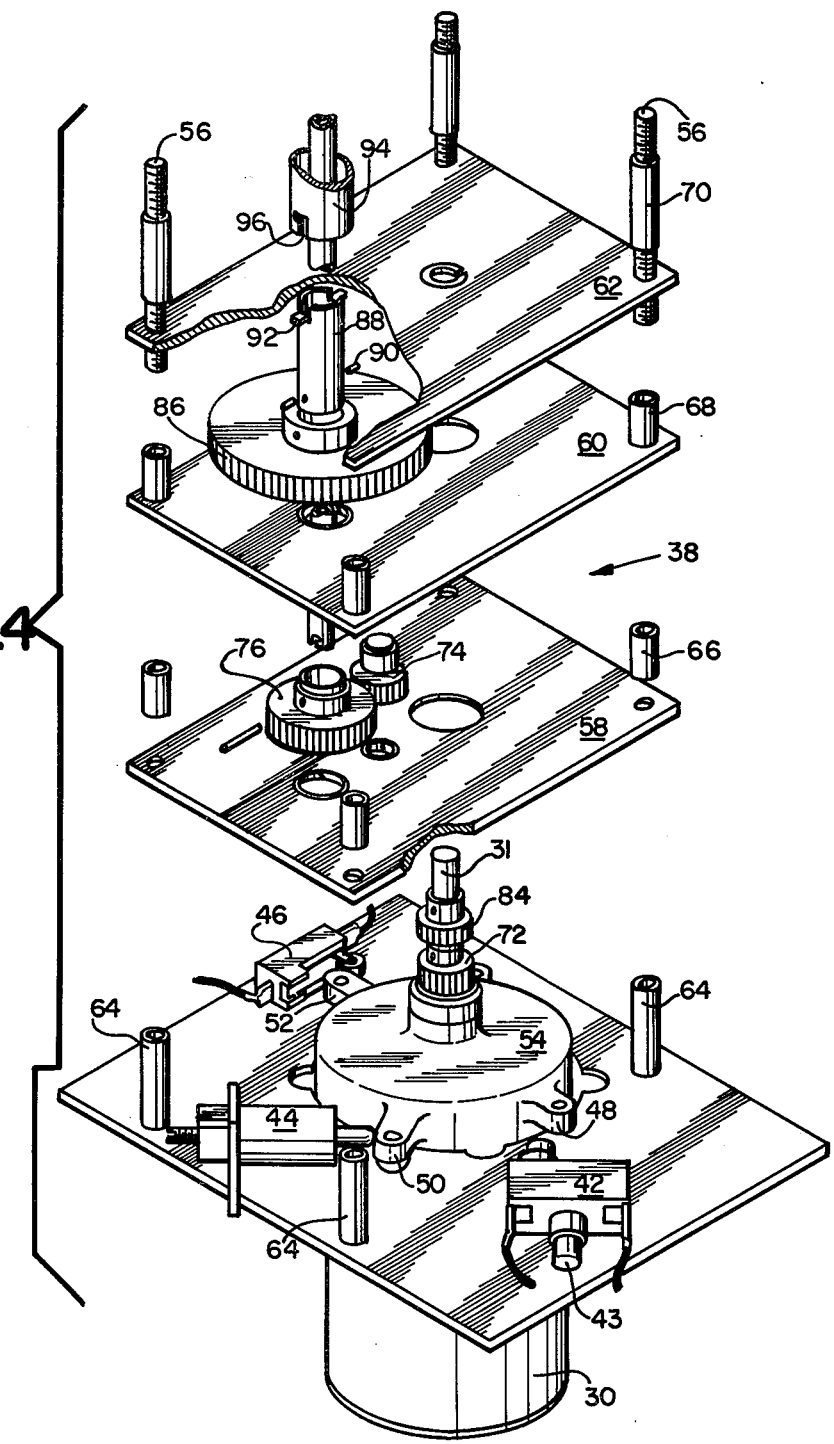

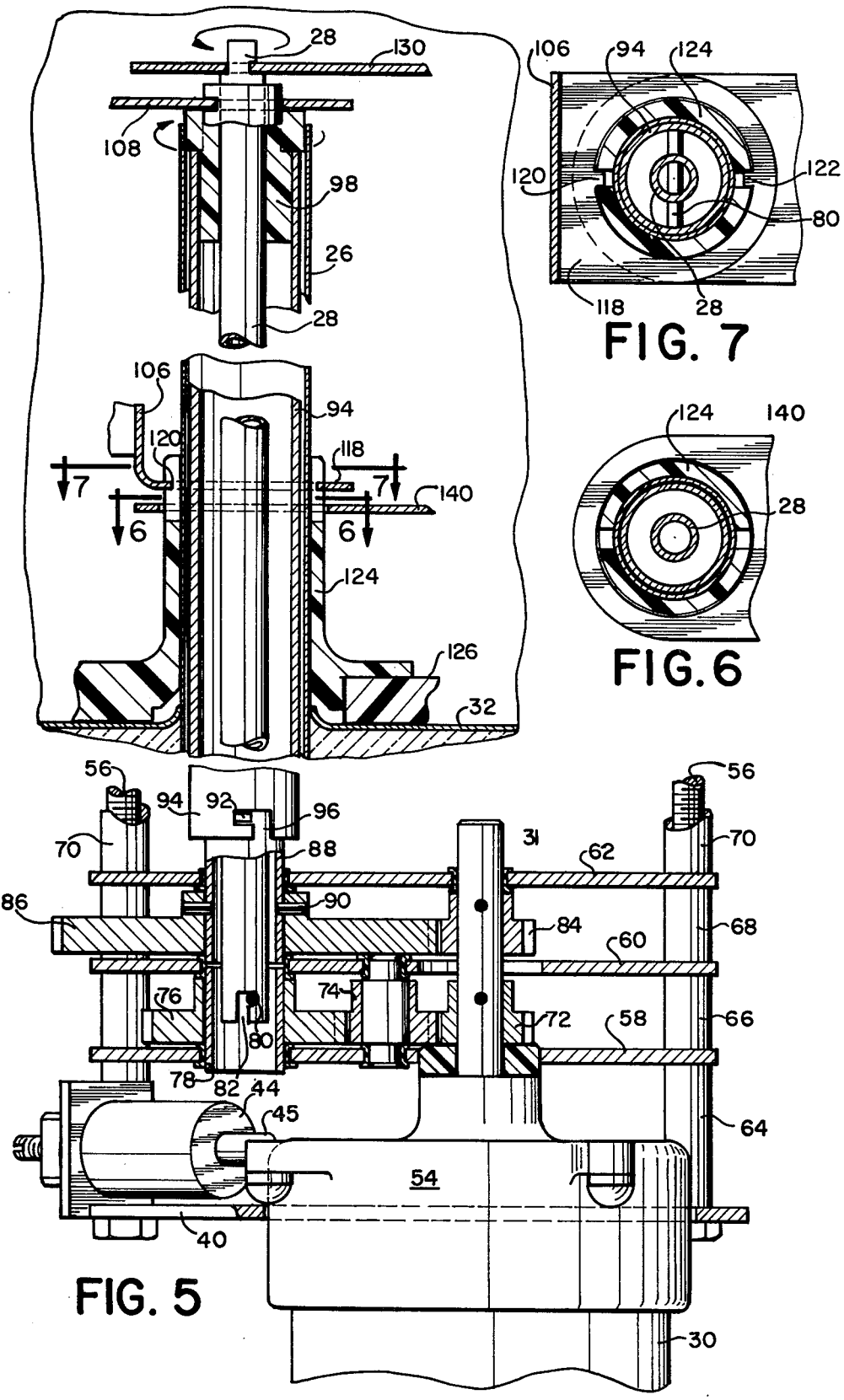

SLUSH DISPENSER

SUMMARY OF THE INVENTION

The flavored slush dispenser of the present invention includes a housing which supports a container adapted to contain a flavored slush or the like. The container is connected to a valved dispensing nozzle. First and second blades are supported for rotation in said container and extend for substantially the entire height of the container. A single motor in said housing is connected to each of said blades for rotating said blades in opposite directions. Coaxial members provide a removable connection between said motor and said blades in a manner so that said connection is separable without the use of tools. A means is provided for removably sealing the container to the housing coaxial with their refrigerated well in the housing in a manner so that the container is also removable without tools.

It is an object of the present invention to provide a novel dispenser for dispensing flavored slush and the like wherein the dispenser is structurally interrelated in a manner which is easy to clean and maintain.

Other objects will appear hereinafter.

For the purpose of illustrating the invention, there is shown in the drawings a form which is presently preferred; it being understood, however, that this invention is not limited to the precise arrangements and instrumentalities shown.

FIG. 4 is an exploded perspective view of the drive and suspension system.

FIG. 5 is a sectional view similar to FIG. 3 but on an enlarged scale.

FIG. 6 is a sectional view taken along the line 6—6 in FIG. 5.

FIG. 7 is a sectional view taken along the line 7—7 in FIG. 5.

Referring to the drawings in detail, wherein like numerals indicate like elements, there is shown in FIG. 1 a dispenser in accordance with the present invention designated generally as 10.

Figure 1:
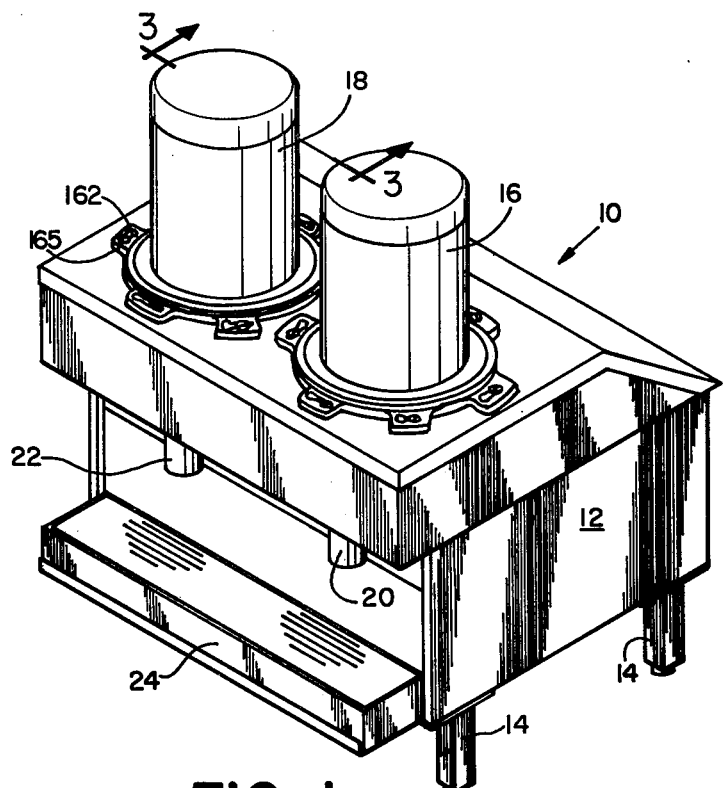
FIG. 1 is a perspective view of a dispenser in accordance with the present invention.
Figure 2:
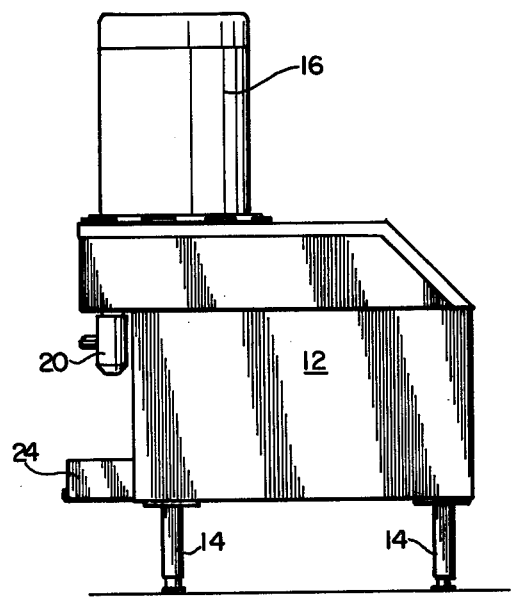
FIG. 2 is a side elevation view of the dispenser shown in FIG. 1.

Dispenser 10 includes a housing designated generally as 12 and which is mounted on legs 14. The housing supports one or more containers adapted to contain a flavored slush or the like. As illustrated, the housing 12 supports containers 16 and 18. Container 16 is connected by a conduit means not shown to the valved nozzle 20. Container 18 is similarly connected to nozzle 22. The nozzles 20, 22 are disposed above an overflow receptacle 24.

Containers 16 and 18 and the mechanisms associated therewith are identical. Hence, only container 18 and its associated mechanisms will be described in detail.

Figure 3:
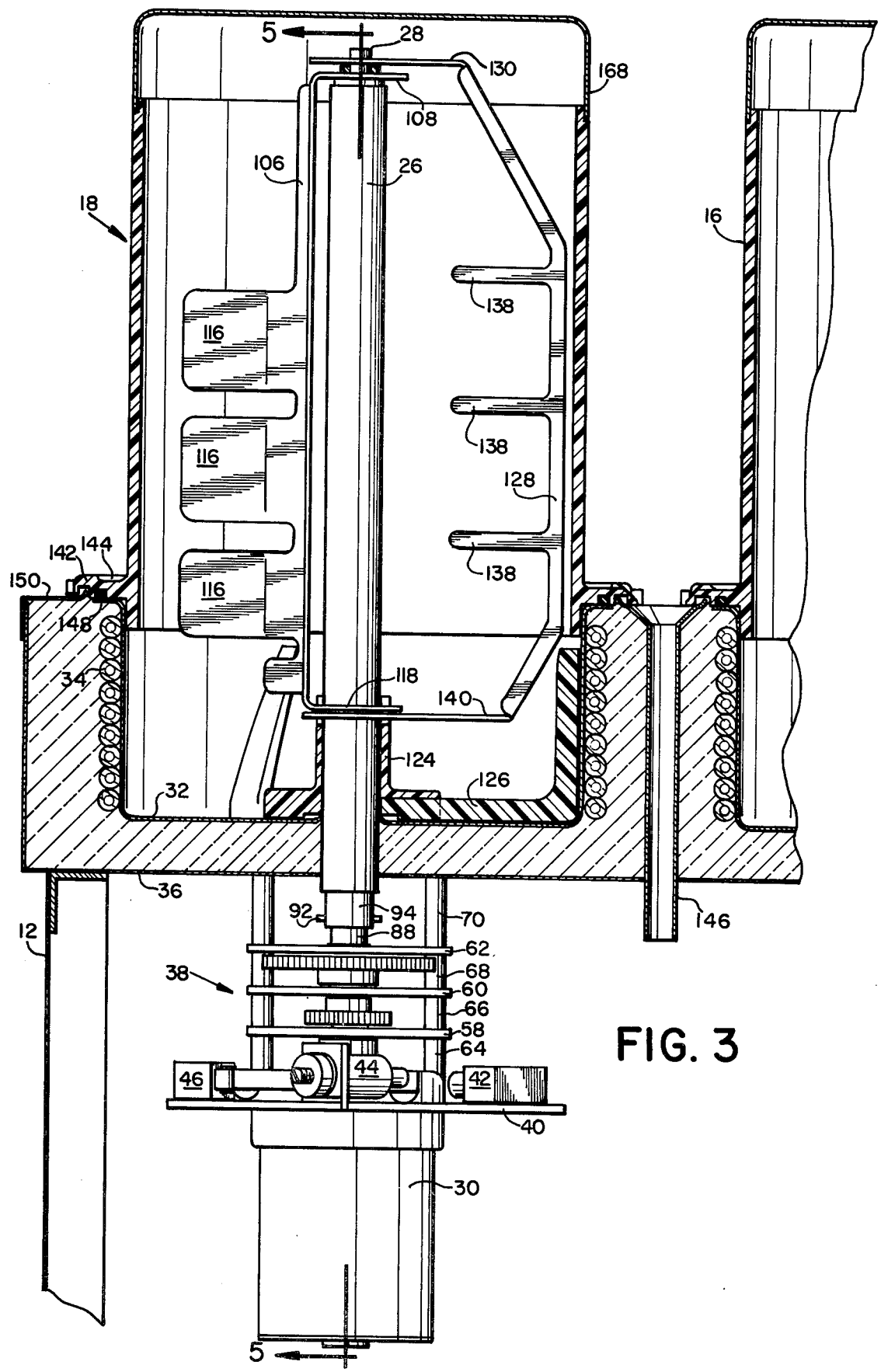
FIG. 3 is a sectional view taken along the line 3—3 in FIG. 1.

Referring to FIGS. 3 and 5, there is provided a stationary tube 26 within the container 18. A drive shaft 28 is coaxial with and disposed within the tube 26. Drive shaft 28 is driven by motor 30 in a manner to be described hereinafter. The container 18 is telescoped into a well 32 on the upper surface of the housing 12. The well 32 is surrounded by refrigeration coils 34 and insulation in a conventional manner. Below well 32, there is provided a partition wall 36. Motor 30 is supported from wall 36 by a suspension and drive system 38.

Referring to FIG. 4, the motor 30 is disposed upright and has an output shaft 31. Motor 30 is supported by a base plate 40 on which is provided an on/off switch 42 having a reset button 43 and a switch 46. A control device 44 having a plunger 45 is also supported on the base plate 40 between the switches 42, 46.

A rotor 54 overlies the base plate 40 and is connected to the motor 30. Rotor 54 has lobes 48, 50 and 52. Lobe 48 is separated from the plunger of switch 42 by an arcuate distance of about 15°. Plunger 45 is spring biased into contact with the lobe 50 at all times. The adjustment of the spring in control member 44 is adjustable by means of a threaded member. The contact of switch 46 is spaced from lobe 52 by an arcuate distance of about 5°. The function of switches 42 and 46 will be described hereinafter.

The base plate 40 is suspended from the partition wall 36 by means of a plurality of rods 56. Rods 56 also support plates 58, 60 and 62 in that order above the elevation of base plate 40. Spacer 64 surrounds the rods 56 and extend between plates 40 and 58. Similarly, spacers 60 extend between plates 58 and 60; spacers 68 extend between plates 60 and 62; and spacers 70 extend between plate 62 and wall 36.

As shown in FIGS. 4 and 5, the output shaft 31 of the motor 30 has a gear 72 fixed thereto. Gear 72 meshed with idler gear 74 journaled in the plates 58 and 60. Idler gear 74 meshes with gear 76 journaled in the plates 58 and 60. Gear 76 is provided with a sleeve 78 therewithin and having a radially disposed pin 80. Pin 80 is connected to the drive shaft 28 by means of a bayonet slot 82 in said drive shaft. Hence, motor 30 rotates drive shaft 28 in a first direction as indicated by the arrow at the top of FIG. 5. It will be noted that drive shaft 28 is offset with respect to the output shaft 31 on the motor 30.

As shown more clearly in FIGS. 4 and 5, a second gear 84 is affixed to the output shaft 31. Gear 84 meshes with gear 86. Gear 86 is journaled between the plates 60 and 62 and is provided with a sleeve 88 therewithin. Sleeve 88 is secured to the gear 86 by pin 90. Sleeve 88 has one or more pins 92 extending radially outwardly therefrom. Pin 92 is releasably connected within a bayonet slot 96 at the lower end of tube 94. Tube 94 surrounds the drive shaft 28 and is telescoped within the tube 26. Thus, motor 30 also rotates tube 94 but in an opposite direction to that of the drive shaft 28.

Figure 8:
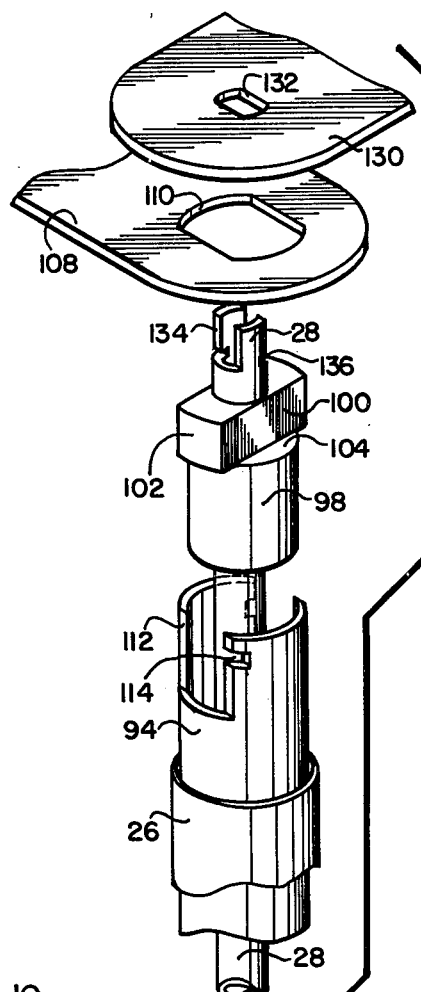
FIG. 8 is an exploded partial perspective view of the upper end of the blades and the drive therefor.

Referring to FIGS. 5 and 8, a bearing 98 is provided at the upper end portions of the shaft 28 and tube 94. Shaft 28 extends through an axial bore in the bearing 98. Bearing 98 is provided with flats 100 on opposite sides and a radially outwardly projecting arcuate surface 102 at each end of the flats. The surfaces 102 extend to the inner peripheral surface of stationary tube 26. Adjacent the flats 100, the bearing 98 is provided with shoulders 104 on opposite sides thereof.

As shown more clearly in FIGS. 3 and 5, a blade 106 is vertically disposed within the container 18 and extends for substantially the entire height thereof. Blade 106 has a radially inwardly directed flange 108. As shown in FIG. 8, flange 108 is provided with a generally rectangular hole 110. Flange 108 rests on the shoulders 104 with hole 110 telescoped over the upper end of tube 94. In order to accommodate the hole 110, the upper end portion of tube 94 is provided with flats 112. Adjacent the flats 112, there is provided notches 114 in the tube 94. Flange 108 extends into the notches 114 and is driven by rotation of tube 94.

As shown more clearly in FIG. 3, the blade 106 has a plurality of radially outwardly directed fingers 116. At the lower end of blade 106, there is provided a radially inwardly directed flange 118. Flange 118 is provided with a hole therein telescoped over a hub 124. Hub 124 is provided with diametrically opposite slots at its upper end. Flange 118 is provided with fingers 120, 122 which extend into the slots on hub 124. See FIG. 7. Thus, as blade 106 rotates, hub 124 is rotatably driven thereby.

The hub 124 is provided with slots on its bottom surface and through which extend one or more scraper blades 126. Three such scraper blades 126 are preferred and spaced equidistant apart from one another. Each of the scraper blades 126 extends along the bottom wall of the well 32 and partially upwardly along the side wall of the well 32. Thus, as the hub 124 rotates, it drives the scraper blades 126 in the same direction as the blade 106.

A second blade 128 is provided within the container 18. Blade 128 is radially outwardly of the periphery of fingers 116 on blade 106 and extends for substantially the entire height of the container 18. At its upper end, blade 128 is provided with a flange 130.

As shown more clearly in FIG. 8, flange 130 is provided with a rectangular hole 132. Hole 132 is telescoped over the upper end of the drive shaft 28. In order to accommodate hole 132, the upper end of drive shaft 28 is provided with flats 134 on opposite sides thereof with the flats having diametrically opposite notches 136. Hence, as drive shaft 28 rotates, it drives blade 128 in a direction opposite to that of the blade 106.

The blade 128 is provided with radially inwardly directed fingers 138. Fingers 138 are offset with respect to the fingers 116 so as to prevent contact between the fingers of the rotating blades. The lower end of blade 128 is provided with a radially inwardly directed flange 140. Flange 140 has a hole therethrough. The hub 124 extends through the hole in flange 140 and acts as a bearing for said flange 140.

Figure 9:
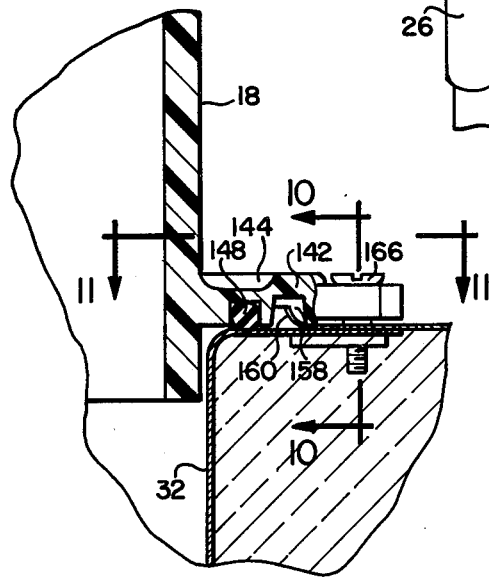
FIG. 9 is an enlarged sectional view showing the mounting for the container.

Referring to FIGS. 3 and 9, adjacent the lower end of the container 18, there is provided a radially outwardly directed flange 142 having a trough 144 at the location where flange 142 extends from the container 18. Condensate forming on the outer periphery of container 18 will collect in trough 144. Between the containers 16 and 18, there is provided an overflow tube 146. Tube 146 communicates with trough 144 by a drilled hole in the flange 142.

On the bottom surface of flange 142, there is provided a seal such as O ring 148. A cover plate 150 overlies the top surface of the housing 12. Cover plate 150 is provided with a hole therein for accommodating the container 18. The inner periphery of the hole in cover plate 150 is defined by lip 160. See FIG. 9. Lip 160 is bent upwardly and extends into a groove on the bottom surface of flange 142. The lip 160 prevents surface liquids from flowing inwardly into the well 32.

Figure 10:
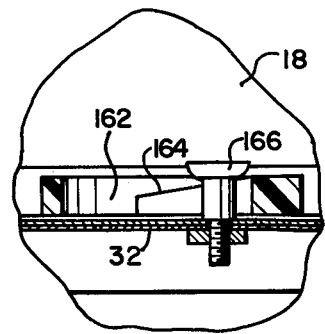
FIG. 10 is a sectional view taken along the line 10—10 in FIG. 9.
Figure 11:
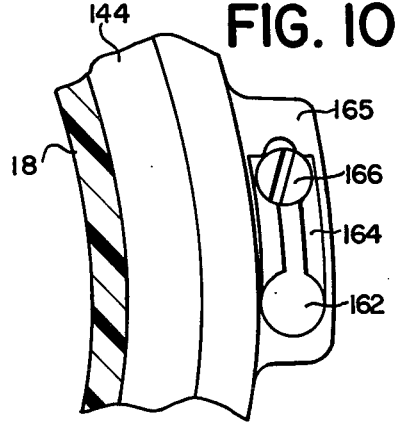
FIG. 11 is a sectional view taken along the line 11—11 in FIG. 9.

As shown in FIG. 1, radially outwardly from the flange 142, there is provided a plurality of projections 165. As shown more clearly in FIGS. 10 and 11, each projection 165 has a keyhole slot 162 partially defined by inclined ramps 164. A fastener 166 extends through the keyhole slot and is provided with a head overlying the projection 165. When the container is positioned so that the fastener 166 extends through the keyhole slot, the container is then rotated for a short distance so as to cam the container 18 downwardly as the fastener 166 rides up the ramps 164 thereby compressing the O ring 148. Container 18 is provided with a removable cover 168.

The dispenser will be provided with a storage tank, pumps for pumping a mixture of flavoring in water to the container 18, associated valved conduits, etc. all of which are not shown and form no part of the present invention. The connection from the well 32 to the valved nozzle 24 is likewise not shown in the drawing.

The operation of the dispenser will be apparent from the above description and the following remarks. Motor 30 rotates shaft 82 in one direction and tube 28 in an opposite direction thereby causing the blades 106 and 128 to rotate in opposite directions. Blade 106 drives scraper blades 126. The blades 106, 126 and 128 maintain the contents of container 18 in an agitated fluid state. If substantial ice forms within the container 18, more torque will be required by the motor 30. Such increased torque on the motor 30 tends to rotate rotor 54 in a clockwise direction in FIG. 4. Such rotation of the rotor 54 is opposed by the spring bias of plunger 45. When the bias on plunger 45 is overcome, lobe 52 will eventually trip switch 46 and shut off the refrigeration to coil 34.

If for some reason the contents of container 18 require still further torque in order to rotate the blades, rotor 54 will rotate through a sufficient arc so that lobe 48 contacts the plunger on switch 42. Switch 42 shuts off the motor and all pumps. In order to restart the motor, it is necessary to push in on the reset button 43.

For purposes of cleaning the container 18 and the well 32, it is only necessary to rotate well 18 through a slot arc and then lift upwardly so that the heads on fasteners 166 pass through the large part of the keyhole 162. Thereafter, the blades and other elements are readily removable by rotating blade 106 in a direction opposite to which it is driven by tube 94 so as to permit separation of pin 92 from slot 96. Also, blade 128 is rotated in a direction opposite to which it is driven so as to permit removal of pin 80 from slot 82. Thereafter, movement in an upward axial direction results in removal of the blades 106, 126 and 128 as well as the drive shaft 28 and the tube 94. Tube 26 is stationary and sealed on its outer periphery to the weld 32 and partition wall 36. The housing 12 is provided with an entry port to facilitate access to the motor 30 for maintenance purposes.

Thus, it will be noted that the container 18 and the blades therewithin are readily removable without the use of tools for facilitating the ease of cleaning of the same while simultaneously being in compliance with specifications of health authorities.

The present invention may be embodied in other specific forms without departing from the spirit or essential attributes thereof and, accordingly, reference should be made to the appended claims, rather than to the foregoing specification as indicating the scope of the invention.

I claim:

1. A dispenser comprising:
   (a) a housing supporting a refrigerated well, a container open at its lower end coaxial with said well and adapted to contain a flavored slush or the like, a valved dispenser nozzle communicating with said container to facilitate dispensing of a liquid from said container, a stationary upright tube supported by said well, said tube being coaxial with said well and projecting upwardly from a bottom wall of said well into said container,
   (b) first and second blades supported for rotation in said container and extending for substantially the entire height of the container, said blades having radially disposed offset fingers,
   (c) a single motor in said housing, said motor being connected to each blade for rotating said blades in opposite directions,
   (d) coaxial members within said stationary tube, each member providing a removable connection between said motor and one of said blades, said connections being manually separable without tools, and
   (e) means removably sealing the lower end of said container with respect to said refrigeration well in a manner so that said container is manually removable without tools.

2. A dispenser in accordance with claim 1 wherein said motor has an output shaft offset from and parallel to said coaxial members.

3. A dispenser in accordance with claim 2 including coaxial gears on said motor output shaft, each of said coaxial gears being coupled to one of said coaxial members to rotatably drive the same.

4. A dispenser in accordance with claim 2 or 3 including a bearing between said stationary tube and said coaxial members at the upper end of said stationary tube, said bearing being in contact with the upper end of said stationary tube on the inner periphery thereof.

5. A dispenser in accordance with claim 1 wherein said removable connection for said coaxial members is a bayonet-slot and pin arrangement.

6. A dispenser in accordance with claim 1 wherein said means removably sealing said container to said housing includes a radially outwardly directed flange adjacent the lower end of said container, a seal on the lower surface of said flange, and means connected to said flange to facilitate a removal connection of the container to said housing.

7. A dispenser in accordance with claim 1 wherein the upper end of said coaxial members is in an elevation above the upper end of said stationary tube.

8. A dispenser in accordance with claim 1 wherein said sealing means includes a groove on a lower end of said container, said groove containing an O-ring seal.

9. A dispenser in accordance with claim 1 wherein said well is supported by a horizontally disposed partition wall of said housing, said motor being removably suspended in an upright disposition by said partition wall, the removable connections between said motor and said coaxial members being located at an elevation below the elevation of said partition wall.

10. A dispenser in accordance with claim 1 including a removable cover on the upper end of said container.

11. A dispenser comprising:
    (a) a housing supporting a container adapted to contain a flavored slush or the like, a valved dispenser nozzle communicating with said container to facilitate dispensing of a liquid from said container, a refrigerated well in said housing, a stationary upright tube supported by said well, said tube being coaxial with said well and projecting upwardly from a bottom wall of said well,
    (b) first and second blades supported for rotation in said container and extending for substantially the entire height of the container,
    (c) a single motor in said housing, said motor being connected to each blade for rotating said blades in opposite directions,
    (d) coaxial members within said stationary tube, each member providing a removable connection between said motor and one of said blades, said connection being manually separable without tools,
    (e) means removably sealing the lower end of said container with respect to said refrigeration well in a manner so that said container is manually removable without tools, and
    (f) said motor being coupled to a rotor, said rotor being spring biased in a first rotary direction, increased torque on said blades tending to cause said rotor to rotate in an opposite direction, first and second switches adapted to be triggered by said rotor after said rotor has rotated through a minimum predetermined arc, said first switch being adapted to control refrigeration associated with said well, said second switch being adapted to stop operation of said motor, 12. A dispenser comprising a housing supporting a refrigerated well, an open bottom container adapted to contain a flavored slush or the like, a valved dispenser nozzle communicating with said container for selectively dispensing the contents of said container, said well and container being coaxial with the open bottom of said container being adjacent the upper end of said wall, blade means disposed within said container and well, said blade means including first and second blades supported for rotation in said container and extending for substantially the entire height of said container, motor means connected to said first and second blades for rotating the same in opposite directions, coaxial members providing a removable connection between said motor means and said blades, said connection being manually separable without tools, a stationary upright tube in said well and container, said coaxial members being disposed within said stationary tube, a bearing between the upper end of said coaxial members, said bearing being in contact with the inner periphery of said stationary tube, means including an O-ring removably sealing the lower end of said container with espect to said well in a manner so that said container is manually removable without tools, and means defining a condensate collection trough adjacent the upper surface of said housing around the bottom end of said container.

13. A dispenser in accordance with claim 12 including switch means responsive to increased torque on said blades for controlling refrigeration of said well and for stopping said motor.

* * * * *